(12) United States Patent
Rooney

(10) Patent No.: US 9,834,907 B1
(45) Date of Patent: Dec. 5, 2017

(54) SYSTEM AND METHOD OF CONCURRENTLY TRENCHING, LAYING AND BURYING UNDERWATER PIPELINE

(71) Applicant: Thomas S. Rooney, Vero Beach, FL (US)

(72) Inventor: Thomas S. Rooney, Vero Beach, FL (US)

( * ) Notice: Subject to any disclaimer, the term of this patent is extended or adjusted under 35 U.S.C. 154(b) by 0 days.

(21) Appl. No.: 15/299,873

(22) Filed: Oct. 21, 2016

Related U.S. Application Data

(60) Provisional application No. 62/347,226, filed on Jun. 8, 2016.

(51) Int. Cl.
| | |
|---|---|
| E02F 5/00 | (2006.01) |
| F16L 1/12 | (2006.01) |
| E02F 5/10 | (2006.01) |
| F16L 55/11 | (2006.01) |

(52) U.S. Cl.
CPC .............. *E02F 5/107* (2013.01); *F16L 55/11* (2013.01)

(58) Field of Classification Search
CPC ... F16L 1/12; F16L 1/235; F16L 55/11; E02F 5/107; E02F 5/104
See application file for complete search history.

(56) References Cited

U.S. PATENT DOCUMENTS

| | | | | |
|---|---|---|---|---|
| 3,926,003 A | * | 12/1975 | Norman ................... | E02F 5/105 405/162 |
| 4,091,629 A | * | 5/1978 | Gunn ...................... | E02F 5/104 405/163 |
| 4,360,290 A | * | 11/1982 | Ward ................... | E21B 43/0107 138/89 |
| 4,586,850 A | * | 5/1986 | Norman ................... | E02F 5/107 114/52 |
| 4,714,379 A | * | 12/1987 | Gilchrist, Jr. ............. | E02F 5/06 405/158 |
| 6,273,642 B1 | * | 8/2001 | Anderson ............... | E02F 5/105 405/163 |
| 6,719,494 B1 | * | 4/2004 | Machin ................. | E02F 3/9206 37/344 |
| 7,637,696 B2 | * | 12/2009 | Antill, Sr. ............ | E02F 3/9206 37/317 |

(Continued)

FOREIGN PATENT DOCUMENTS

| | | | | | |
|---|---|---|---|---|---|
| FR | 2425601 A1 | * | 12/1979 | .............. | E02F 5/104 |
| GB | 673535 A | * | 6/1952 | .............. | E02F 3/925 |
| GB | 1316481 A | * | 5/1973 | ............ | E02F 3/9206 |

*Primary Examiner* — Benjamin Fiorello
(74) *Attorney, Agent, or Firm* — Dunlap Bennett & Ludwig PLLC

(57) ABSTRACT

A system and method for laying an underwater pipeline is provided. The present invention includes a plurality of pipe support rings connected together by tension cables. The tension cables are secured to a S or J laying ship by a winch. The plurality of pipe support rings form a pipe channel sized to guide the underwater pipeline. The present invention further includes a sea water pipe having a distal portion and a proximal end. The proximal end is fluidly connected with a pump on board the ship. The distal end includes a plurality of nozzles. The sea water pipe is disposed underneath the plurality of pipe support rings. The underwater pipeline is fed through the plurality of pipe support rings while the nozzles form a trench on a sea bed.

18 Claims, 5 Drawing Sheets

(56) References Cited

U.S. PATENT DOCUMENTS

2003/0177670 A1\* 9/2003 Anderson .............. E02F 5/105
 37/307
2014/0286708 A1\* 9/2014 Rolf ......................... F16L 1/20
 405/158

\* cited by examiner

SYSTEM AND METHOD OF CONCURRENTLY TRENCHING, LAYING AND BURYING UNDERWATER PIPELINE

CROSS-REFERENCE TO RELATED APPLICATION

This application claims the benefit of priority of U.S. provisional application No. 62/347,226, filed Jun. 8, 2016, the contents of which are herein incorporated by reference.

BACKGROUND OF THE INVENTION

The present invention relates to laying underwater pipelines and, more particularly, to a system and method of concurrently trenching, laying and burying underwater pipeline.

Underwater pipelines often must be buried in the sea floor in order to protect them from icebergs, anchors, nets, currents, thermal instability and the like. The present state of the art is to either dig or plow a trench before laying the pipe, lay the pipe and then back fill the trench. Alternatively, the pipe is laid first and then either using jets, mechanical cutting machines or plows, the sea floor is cut underneath the pipe and allowing the pipe to settle in the trench. Both methods are very expensive.

Dredging or plowing in sand or loose material which is frequently experienced on continental shelves often results in slope sluffing and very high dredge quantities. Mechanical dredging from the surface is uneconomical over 100 meters and requires dredging from the seabed which means very low production and high costs. Plowing from the seabed has resulted in many bad experiences with many shut downs, high maintenance and therefore high cost.

Burying the pipe after it is laid is also very expensive because of the low production equipment involved. The large jetting barges and jetting machines require several passes because they have to work around the pipe. Both methods involve two different operations. To date, there are no successful systems or methods for concurrently trenching, laying rigid steel pipe and burying it all in one operation for large scale pipe (8" to 72") from either J lay or S Lay pipe laying ships.

As can be seen, there is a need for a system/method for concurrently trenching and burying while laying the underwater pipe. The present invention utilizes the resources of the pipe laying ship to create a high pressure seawater jetting system that trenches the pipe without slowing the pipe laying speed of the ship.

SUMMARY OF THE INVENTION

In one aspect of the present invention, a system for laying an underwater pipeline comprises: a plurality of pipe support rings connected together by tension cables, wherein the tension cables are securable to a ship by a winch and the plurality of pipe support rings form a pipe channel sized to guide the underwater pipeline; and a sea water pipe comprising a distal portion and a proximal end, wherein the sea water pipe is disposed underneath the plurality of pipe support rings, the proximal end is fluidly connected with a pump and the distal end comprises a plurality of nozzles.

In another aspect of the present invention, a method of laying underwater pipeline from a ship comprises: providing a plurality of pipe support rings connected together by tension cables, wherein the tension cables are secured to a ship by a winch and a sea water pipe comprising a distal portion and a proximal end, wherein the sea water pipe is disposed underneath the plurality of pipe support rings, the proximal end is fluidly connected with a pump and the distal end comprises a plurality of nozzles; running the underwater pipeline over a stinger disposed at a rear end of the ship and through the plurality of pipe support rings via a tensioner secured to the ship; and pumping pressurized fluid from the pump and through the sea water pipe, wherein the plurality of nozzles blast a sea floor forming a trench, wherein the underwater pipeline rests within the trench.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is directed to a system that allows a pipe laying ship (S Lay or J Lay) to trench and bury large pipe concurrently while the ship is laying the pipe. The trenching technique is a combination of eroding the soil and moving it and decreasing the in situ density of the soil so appropriate settlement will take place. A large pump which generates high pressure and a large volume of sea water is located on the ship or adjacent to it. The sea water discharge pipe from this pump is fixed to the stinger and then to the larger pipe being laid by the ship on the sea floor. When the two pipes get to the sea floor the sea water pipe splits into two pipes which run alongside the larger pipe. The two sea water pipes may include four movable nozzles located on rings spaced along the large pipe. Those nozzles decrease the density of soil below the large pipe and they also erode the soil along the side of the large pipe. The large pipe has a marginally negative force when it is empty and being laid. Sea water is maintained inside the large pipe in the laying area so that settlement of the pipe is easily and quickly achieved. This sea water may be maintained in the pipe by a remotely operated pipe plug located on the horizontal portion of the large pipe. This pipe plug will be tethered to the pipe lay ship with power and controls. The plug may move with the within the large pipe. A control system may operate on the ship which varies the location of the plug and the rotating speed of the pump impeller to synchronize the speed and depth of the trenching with the laying speed of the ship.

Figure 1:
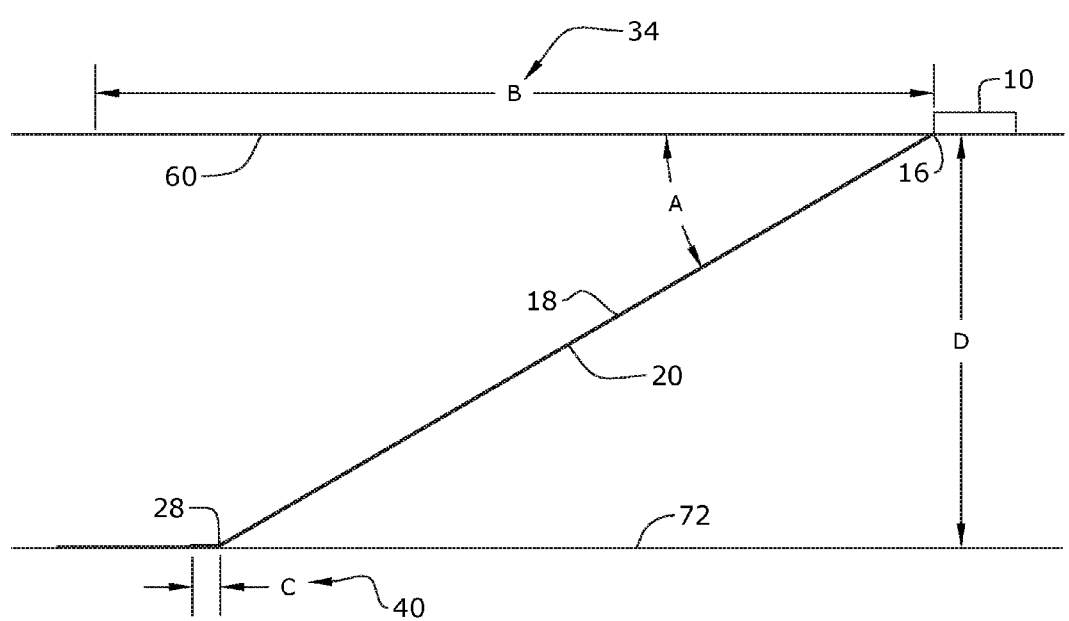
FIG. 1 is a schematic view of an embodiment of the present invention.
Figure 2:
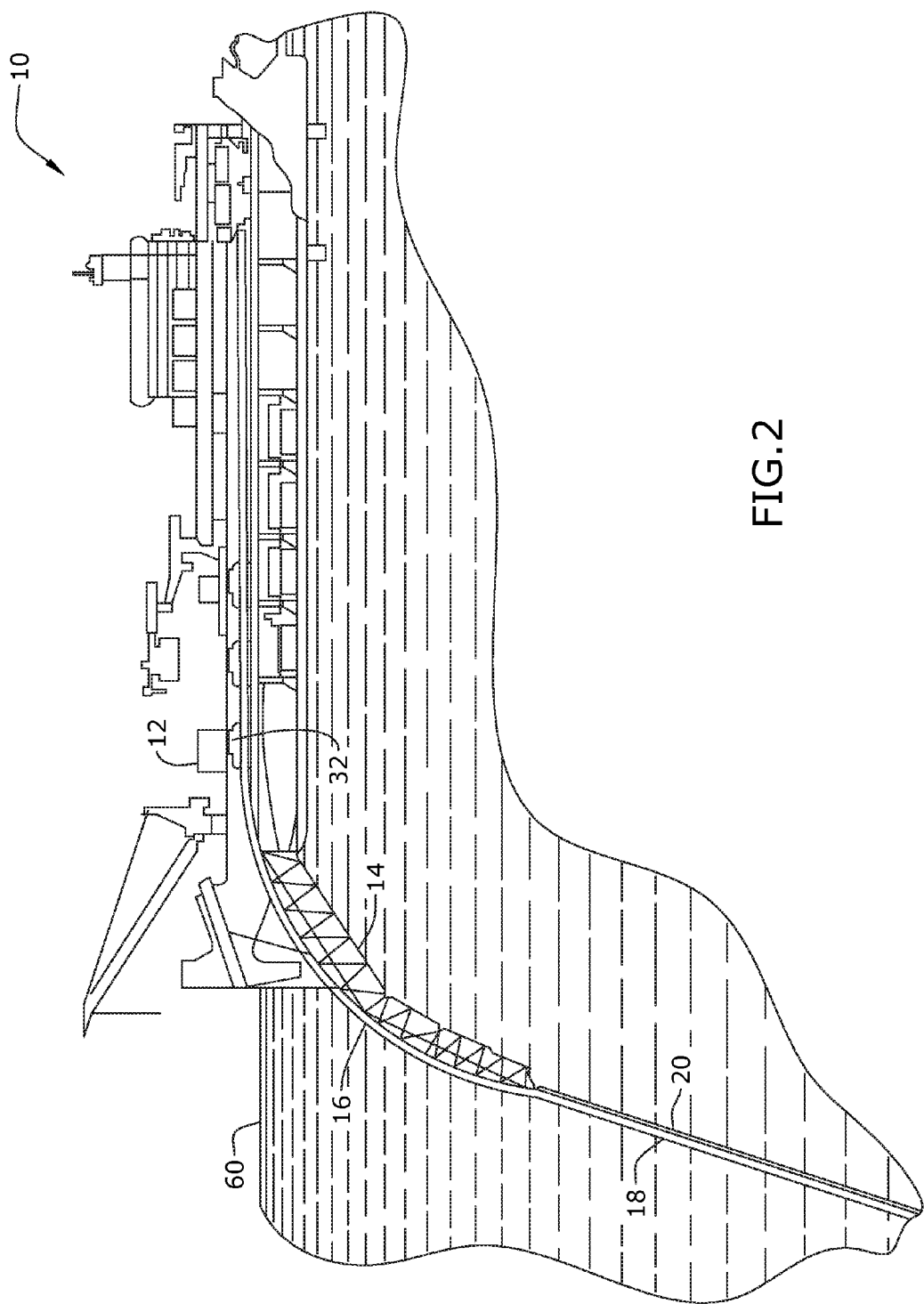
FIG. 2 is an elevation view of an embodiment of the present invention.
Figure 3:
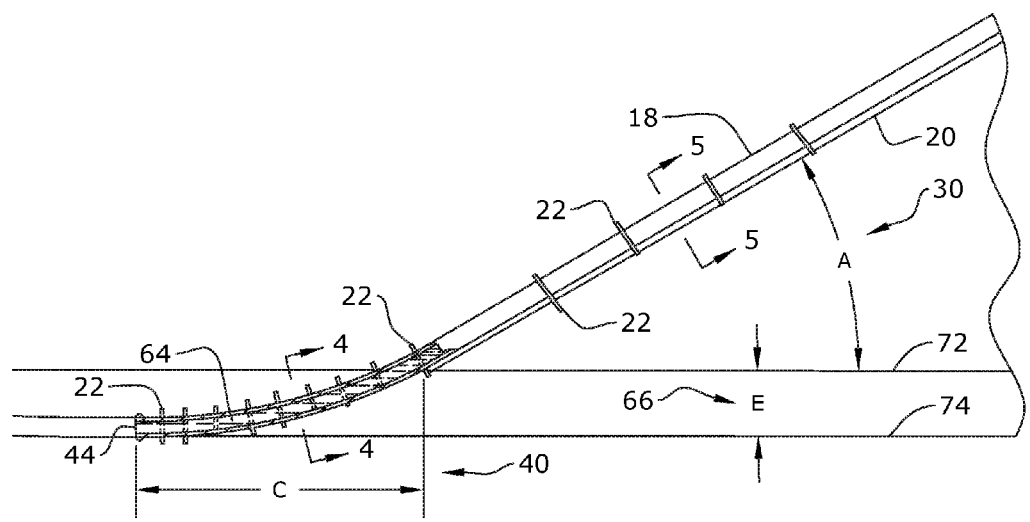
FIG. 3 is a schematic view of an embodiment of the present invention.
Figure 4:
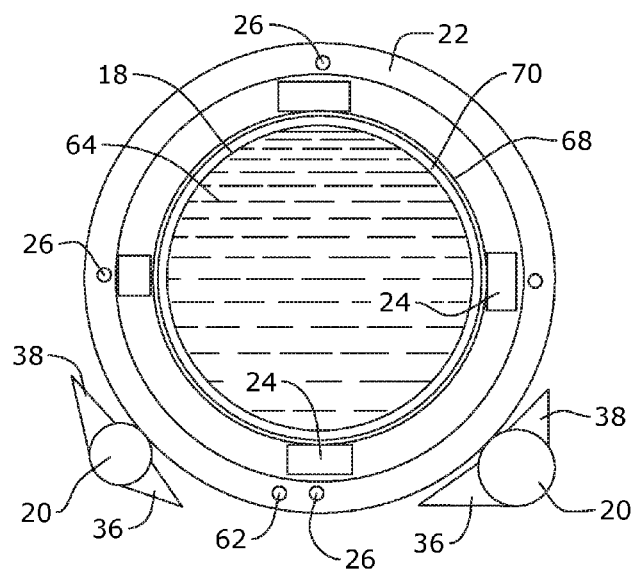
FIG. 4 is a section view of an embodiment of the present invention taken along line 4-4 in FIG. 3.
Figure 5:
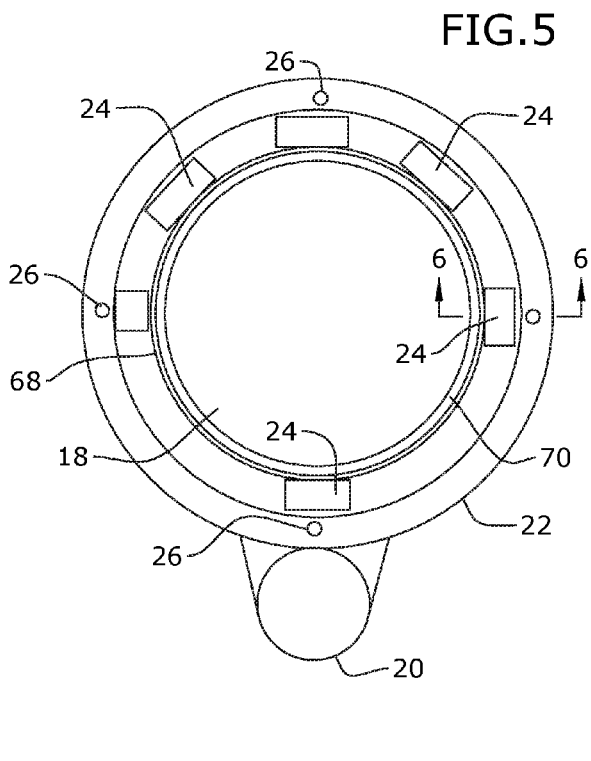
FIG. 5 is a section view of an embodiment of the present invention taken along line 5-5 in FIG. 3.
Figure 6:
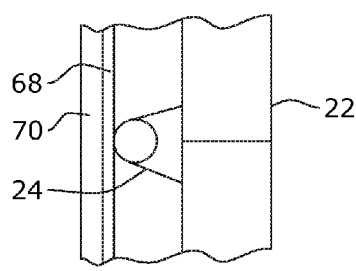
FIG. 6 is a section view of an embodiment of the present invention taken along line 6-6 in FIG. 5.
Figure 7:
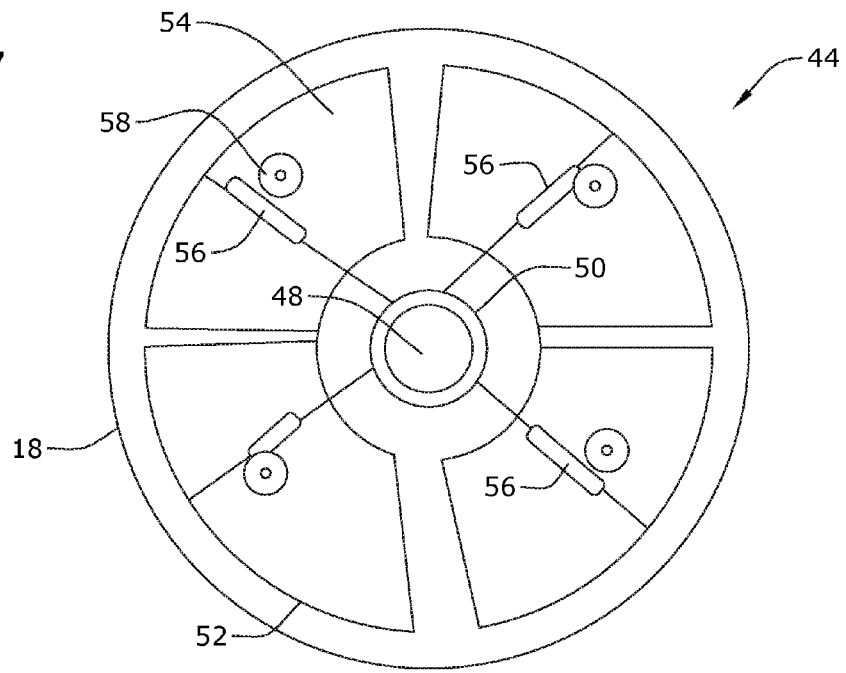
FIG. 7 is an elevation view of an embodiment of the plug of the present invention.
Figure 8:
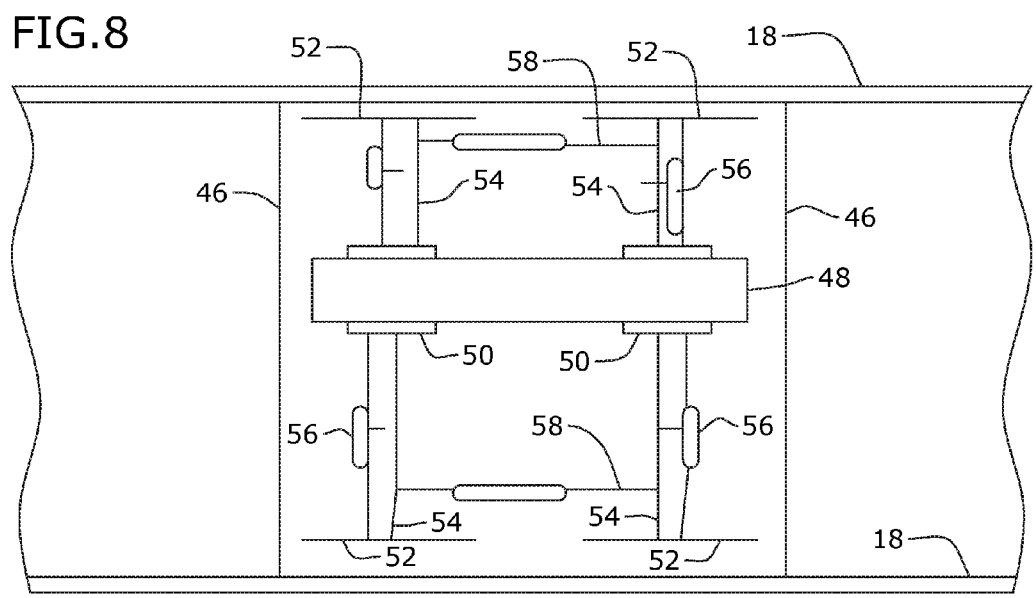
FIG. 8 is a section detail view of an embodiment of the plug of the present invention.

Referring to FIGS. 1 through 8, the present invention includes a system and method for laying an underwater pipeline 18. The present invention includes a plurality of pipe support rings 22 connected together by tension cables 26. The tension cables 26 are secured to a S or J laying ship 10 by a winch. The plurality of pipe support rings 22 form a pipe channel sized to guide the underwater pipeline 18. The present invention further includes a sea water pipe 20 having a distal portion and a proximal end. The proximal end is fluidly connected with a pump 12 on board the ship 10. The distal end includes a plurality of nozzles 36, 38. The sea water pipe 20 is disposed underneath the plurality of pipe support rings 22. The underwater pipeline 18 is fed through the plurality of pipe support rings 22 while the nozzles 36, 38 form a trench 74 on a sea bed 72. Therefore, the ship 10 is able to maintain a constant speed while the underwater pipeline 18 is being laid and buried on the sea bed 72.

The underwater pipeline 18 may include a steel sea water gas pipe 70 with a surrounding concrete ballast 68. As mentioned above, the underwater pipeline 18 is delivered from a rear end of the ship 10. A stinger 14 may be attached to the rear end of the ship 10 and guides the underwater pipeline 18 from the ship 10 through the pipe support rings 22 and into the water 60 along an overbend 16. A tensioner 32 is secured to the ship 10. The tensioner 32 grips and releases the underwater pipeline 18 at a controlled pace.

As mentioned above, the plurality of pipe support rings 22 support the underwater pipeline 18 as it is being laid on the sea bed 72. In certain embodiments, a plurality of rollers 24, such as TEFLON® roller bearings, may be secured to an inner surface of each of the plurality of pipe support rings 22. The underwater pipeline 18 slideably engages with the rollers 24 as it runs through the pipe channel. Each of the plurality of pipe support rings 22 may further include an elevation sensor 62 capturing data and sending the data to a main computer system in control of the tensioner 32.

In certain embodiments, the sea water pipe 20 diverts from a single pipe to a first pipe and a second pipe at the distal portion. The first pipe and the second pipe each include the plurality of nozzles 36, 38. The first pipe and the second pipe are disposed along opposing sides of a bottom half of the plurality of pipe support rings 22. For example, the first pipe may be at about 7 o'clock to 8 o'clock positions and the second pipe may be at about 4 o'clock to 5 o'clock positions. The plurality of nozzles 36, 38 may include a plurality of horizontal nozzles 36 disposed on an inner side of each of the first pipe and the second pipe and a plurality of vertical nozzles 38 disposed on an outer side of each of the first pipe and the second pipe. The horizontal nozzles 36 may blast the sea bed 72 forming a trench 74 and the vertical nozzles 38 may blast the uprooted sediment away from the underwater pipeline 18, thereby allowing the underwater pipeline 18 to embed within the formed trench 74.

In certain embodiments, sea water 64 may be disposed within a portion of the underwater pipeline 18 to provide additional weight to the pipeline 18 as it sinks into the trench 74. The pipe plug 44 may also be used as a block for the intermittent pressure testing of the completed gas pipeline 18. In such embodiments, the present invention may include a pipe plug 44 disposed within the underwater pipeline 18 to contain the sea water 64 within the proper portion of the underwater pipeline 18. The pipe plug 44 is mechanically operable to move along the inside of the underwater pipeline 18 as the pipeline 18 is being laid to continuously shift the weight to the portion that is being laid within the trench 74. The pipe plug 44 includes a front surface 46 and a rear surface 46. Disposed in between the surfaces 46 is an upper portion and a lower portion with a shaft 48 in between the upper and lower portions. The upper portion may include a pair of vertical shoe flanges 54 each having a horizontal collar 50 at a proximal end engaging the shaft 48 and a horizontal foot 52 at a distal end engaging the inside of the pipeline 18 wall. The lower portion may also include a pair of vertical shoe flanges 54 each having a horizontal collar 50 at a proximal end engaging the shaft 48 and a horizontal foot 52 at a distal end engaging the inside of the pipeline 18 wall. Each of the shoe flanges 54 includes a vertical jack 56. The pair of shoe flanges 54 of the upper portion are connected by a horizontal jack 58 and the pair of shoe flanges 54 of the lower portion are connected by a horizontal jack 58. When moving along the inside of the pipeline 18, the vertical jacks 56 may retract a rear pair of shoes 52 from engaging the inside of the pipeline 18 and press the rear collars 50 against the shaft 48. The vertical jacks 56 may press the front pair of shoes 52 against the inside of the pipeline 18 and retract the front collars 50 away from the shaft 48. The horizontal jack 58 then pulls the front pair of shoe flanges 54 towards the rear pair of shoe flanges 54. The front collars 50 then grip the shaft 48 via the vertical jacks 56 and the rear collars 50 retract from the shaft via the vertical jacks 56. The horizontal jacks 58 then push the shaft 48 forward with the front pair of shoe flanges 54, thereby moving the plug 44 forward.

During operation, the trenching zone 40 should be as long as possible so that the jetting system has time to do its job. This can be achieved by making sure the sea bend 28 has the largest radius possible. The sea bend 28 radius is determined by the amount of tension the tensioners 32 provide to the pipeline 18. The trench C 40 is longer when the tension is higher. The over bend 16 is formed by the stinger 14 and the stinger 14 protects the pipeline 18 from crushing due to an over bend with a radius that is too small. However, when the system is in physical equilibrium the over bend 16 equals the sea bend 28.

The method and system of the present invention enables S Lay pipe laying ships to lay large pipes under water and concurrently trench and bury them during the laying procedure. The S Lay ships can lay large pipes at the rate of 2.5 miles per day or 10 feet per minute. The concurrent burying system matches that laying speed. The present invention is primarily, but not exclusively intended for laying large (12" to 72") gas, oil, or fresh water pipelines on sea, ocean bay, lake or river bottoms by any of the many S Lay or J Lay vessels anywhere in the world. The system takes cost advantage of the ship deck space to mount very large powerful pump/motor units that will develop high volume high pressure sea water for jetting. The pumps have variable speed motors and controls to vary the volume and pressure when signaled to do so by the elevation sensing devices on all of the aluminum rings located in the trenching zone. The discharge of the pumps are through a large flexible stainless steel pipe which attaches to the bottom of the stinger and proceeds down the stinger to its end. The pipe is fixed to the first aluminum ring which surrounds the pipe. The rings support the sea water pipes from this point through to the end of the trenching zone 16. The spacing of the rings is closer in the trenching zone because of the turbulence of the jetting action.

The gas pipe provides the structural support for the sea water pipe with its unused (at this time) structural strength. Just before reaching the sea bottom the sea water pipe splits into two sea water pipes and are mounted on the bottom of the gas pipe. The pipe is supported on the ring by TEFLON® roller bearings. The aluminum rings are at a fixed distance from the S Lay ship by virtue of the galvanized steel cables at the ring quarters. The four cables are fixed to the ship on winches and there is a friction stop at each ring. There may be spare rings stored around the pipe near the stinger to allow for flexibility in depth during laying major changes in depth may require shutdown and ring refitting. In the trenching zone, water jet nozzles may be included on rings spaced at every two feet along the length of the two sea water pipes. The horizontal flood nozzles disturb the soil particles, put them in suspension, and lower the comprehensive strength of the soil so settlement can occur. The vertical transportation nozzles disturb the soil, reduce its strength and then move the soil upwards. Simultaneously sea water is injected into the gas pipeline and this pipe contains the mobile plug. The purpose of the plug is to restrain the ballast sea water in the pipe. The plug with its membrane or sidewall seals the water within the pipeline. The plug moves in both directions in the pipe at the rate of about 10 feet per minute. The A unit within the plug closes its shoes against the pipe with its vertical jacks. The B unit releases its vertical jacks and move away from the A unit with its horizontal jacks. The B unit then closes its shoes against the pipeline with its vertical jacks. The A unit then releases its vertical jacks and moves toward B with its horizontal jacks. The sea water that is loaded in the pipeline is used to enhance the settlement process. The empty pipe is heavier than the displaced water and when the sea water is in the pipe the latter is much heavier than the displaced water, thereby accelerating the settlement. The plug and the retained sea water move as required to regulate the settlement process. If the settlement is occurring too quickly the plug and sea water move in the gas pipe away from the ship to lessen its effect on settlement. The plug may be controlled automatically from controls on the ship.

The present invention is applicable to a variety of soil conditions. The S Lay ship is outfitted for the concurrent trenching laying and burying method, preferably with such as with a large (as much as 10000HP capacity) pump motor capacity on the deck of the ship. This redundancy is used so the jetting can continue when the pipe laying is shut down. The pump/motor may have variable speed controls so the pressure and volume to the jets can be varied at the central control room. Additional jets may be required for tougher soil and the jets may be movable and remotely operated. The rings in the trenching area may be galvanized steel to decrease the profile and to give added strength when pulling through the trenching zone.

It should be understood, of course, that the foregoing relates to exemplary embodiments of the invention and that modifications may be made without departing from the spirit and scope of the invention as set forth in the following claims.

What is claimed is:

1. A system for laying an underwater pipeline comprising:
a plurality of pipe support rings spaced apart and connected together by tension cables, wherein the tension cables are securable to a ship by a winch and the plurality of pipe support rings align to form a pipe channel sized to guide the underwater pipeline within; and
a sea water pipe comprising a distal end and a proximal end, wherein the proximal end is fluidly connected with a pump and the distal end is secured to an underside of a portion of the plurality of pipe support rings and comprises a plurality of nozzles.

2. The system of claim 1, further comprising a tensioner securable to the ship and operable to apply tension to the underwater pipeline.

3. The system of claim 1, further comprising a stinger securable to an end of the ship and operable to guide the underwater pipeline from the end of the ship and into a body of water.

4. The system of claim 1, further comprising a plurality of roller bearings disposed within each of the plurality of pipe support rings and slidably engaged with the underwater pipeline.

5. The system of claim 1, wherein the sea water pipe diverts from a single pipe to a first pipe and a second pipe at the distal portion.

6. The system of claim 5, wherein the first pipe and the second pipe each comprise the plurality of nozzles.

7. The system of claim 6, wherein the first pipe and the second pipe are disposed along opposing sides of a bottom half of the plurality of pipe support rings.

8. The system of claim 7, wherein the plurality of nozzles comprise a plurality of horizontal nozzles disposed on an inner side of each of the first pipe and the second pipe and a plurality of vertical nozzles disposed on an outer side of each of the first pipe and the second pipe.

9. The system of claim 1, further comprising a pipe plug sized to plug the underwater pipeline and mechanically operable to move along the inside of the underwater pipeline.

10. A method of laying underwater pipeline from a ship comprising:
providing a plurality of pipe support rings spaced apart and connected together by tension cables, wherein the tension cables are secured to a ship by a winch and a sea water pipe comprising a distal end and a proximal end, wherein the proximal end is fluidly connected with a pump and the distal end is secured to an underside of a portion of the plurality of pipe support rifles and comprises a plurality of nozzles;
running the underwater pipeline over a stinger disposed at a rear end of the ship and through the plurality of pipe support rings via a tensioner secured to the ship; and
pumping pressurized fluid from the pump and through the sea water pipe, wherein the plurality of nozzles blast a sea floor forming a trench, wherein the underwater pipeline rests within the trench.

11. The method of claim 10, wherein each of the plurality of pipe support rings further comprise a plurality of roller bearings slidably engaged with the underwater pipeline.

12. The method of claim 10, wherein the sea water pipe diverts from a single pipe to a first pipe and a second pipe at the distal portion.

13. The method of claim 10, wherein the first pipe and the second pipe each comprise the plurality of nozzles.

14. The method of claim 13, wherein the first pipe and the second pipe are disposed along opposing sides of a bottom half of the plurality of pipe support rings.

15. The method of claim 14, wherein the plurality of nozzles comprise a plurality of horizontal nozzles disposed on an inner side of each of the first pipe and the second pipe and a plurality of vertical nozzles disposed on an outer side of each of the first pipe and the second pipe.

16. The method of claim 10, further comprising the steps of:

inserting water into the underwater pipeline to a portion where the underwater pipeline is being laid within the trench;

providing a pipe plug sized to plug the underwater pipeline and contain the water at the portion within the underwater pipeline; and moving the pipe plug along the underwater pipeline as the underwater pipeline is being laid.

17. The apparatus of claim 1, wherein the tension cables comprise a first tension cable secured to a first side of each of the plurality of support rings and a second tension cable secured to a second side of each of the plurality of support rings, wherein the first side is opposite the second side.

18. A system for laying an underwater pipeline comprising:

a plurality of pipe support rings spaced apart and connected together by a first tension cable secured to a first side of each of the plurality of support rings and a second tension cable secured to a second side of each of the plurality of support rings, wherein the first side is opposite the second side, wherein the first and second tension cables are securable to a ship by a winch and the plurality of pipe support rings align to form a pipe channel sized to guide the underwater pipeline within; and a sea water pipe comprising a distal portion and a proximal end, wherein the sea water pipe is secured to an underside of the plurality of pipe support rings, the proximal end is fluidly connected with a pump and the distal portion comprises a plurality of nozzles disposed underneath the plurality of pipe support rings.

\* \* \* \* \*